(12) United States Patent
Viswanathan et al.

(10) Patent No.: US 8,581,742 B2
(45) Date of Patent: Nov. 12, 2013

(54) BANDWIDTH WIRELINE DATA TRANSMISSION SYSTEM AND METHOD

(75) Inventors: Raman Viswanathan, Houston, TX (US); Randy Gold, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 1157 days.

(21) Appl. No.: 12/104,256

(22) Filed: Apr. 16, 2008

(65) Prior Publication Data

US 2008/0218375 A1 Sep. 11, 2008

Related U.S. Application Data

(63) Continuation-in-part of application No. 11/611,646, filed on Dec. 15, 2006, which is a continuation of application No. 11/086,944, filed on Mar. 22, 2005, now abandoned, which is a continuation-in-part of application No. 09/586,130, filed on Jun. 2, 2000, now abandoned.

(60) Provisional application No. 60/193,098, filed on Mar. 30, 2000.

(51) Int. Cl.
  *G01V 1/00* (2006.01)
(52) U.S. Cl.
  USPC .................................................. 340/854.9
(58) Field of Classification Search
  USPC .................................................. 340/854.9
  See application file for complete search history.

(56) References Cited

U.S. PATENT DOCUMENTS

| | | |
|---|---|---|
| 3,209,064 A | 9/1965 | Cutler |
| 3,259,675 A | 7/1966 | Bowers |
| 3,602,632 A | 8/1971 | Ollis |
| 3,678,177 A | 7/1972 | Lawrenson |
| 4,077,022 A | 2/1978 | Pitts |
| 4,355,310 A | 10/1982 | Belaigues et al. |
| 4,440,974 A | 4/1984 | Naudet |
| 4,777,324 A | 10/1988 | Lee |
| 5,148,408 A | 9/1992 | Matthews |
| 5,387,907 A | 2/1995 | Gardner et al. |
| 5,444,184 A * | 8/1995 | Hassel ................ 174/113 R |
| 5,495,547 A | 2/1996 | Rafie et al. |
| 5,504,479 A | 4/1996 | Doyle et al. |
| 5,521,592 A | 5/1996 | Veneruso |
| 5,574,250 A | 11/1996 | Hardie et al. |
| 5,952,607 A | 9/1999 | Friesen et al. |

(Continued)

FOREIGN PATENT DOCUMENTS

| | | |
|---|---|---|
| CA | 2 259 719 | 7/1999 |
| EP | 0 880 147 A1 | 11/1998 |
| GB | 2 321 973 A | 8/1998 |

*Primary Examiner* — John Kreck
(74) *Attorney, Agent, or Firm* — Mossman Kumar & Tyler PC (57) ABSTRACT

A suspended well logging device for use in a wellbore drilled in an earthen formation may include a cable configured to be conveyed into the wellbore; a single twisted pair of conductors positioned in the cable; and a conductive armor surrounding the single twisted pair of conductors. In embodiments, the device may further include a first channel formed using the single twisted pair of conductors; a second channel formed using the single twisted pair of conductors and the armor; and a wellbore logging tool coupled to an end of the cable.

26 Claims, 7 Drawing Sheets

(56) References Cited

U.S. PATENT DOCUMENTS

| | | |
|---|---|---|
| 6,127,632 A | 10/2000 | Oswald et al. |
| 6,206,133 B1 | 3/2001 | Paulsson |
| 6,369,718 B1 * | 4/2002 | Mathieu .................... 340/853.7 |
| 6,580,751 B1 | 6/2003 | Gardner et al. |
| 2004/0050589 A1 * | 3/2004 | Head .............................. 175/57 |

* cited by examiner

BANDWIDTH WIRELINE DATA TRANSMISSION SYSTEM AND METHOD

CROSS-REFERENCE TO RELATED APPLICATIONS

This application is a continuation-in-part of U.S. application Ser. No. 11/611,646 filed on Dec. 15, 2006, which is a continuation of U.S. application Ser. No. 11/086,944 filed Mar. 22, 2005, now abandoned, which is a continuation-in part of U.S. application Ser. No. 09/586,130 filed on Jun. 2, 2000, now abandoned, which application takes priority from U.S. Provisional Application No. 60/193,098 titled "Improved Bandwidth Wireline Data Transmission System and Method" filed on Mar. 30, 2000, the entire specification of each application being hereby incorporated herein by reference.

BACKGROUND OF THE DISCLOSURE

1. Field of the Disclosure

This disclosure pertains to data communications and particularly to data communications on a wireline such as one employed in an oil or gas well borehole application.

2. Description of the Prior Art

It is common in an oil or gas well borehole application to transmit and receive electrical digital data and control signals between surface electronics and downhole electronics package via a wireline of one or more conductors connecting the two. Such signals are typically used to remotely control the functions of various downhole devices such as sensors for detecting borehole parameters as well as tools and devices for performing functional operations in the borehole such as setting equipment or operating testers, motors, directional drilling equipment or the like, which may be operable in stages and in any event requiring a plurality of differing control signals at different times. Likewise, it is desirable to transmit information indicative of the operation of the downhole devices or parameters detected or measured downhole, to the surface over the same conductor path. It is customary in such downhole operations to utilize a sheathed or armored cable which includes either a single conductor or multiple conductors. A single conductor armored cable typically includes a single insulated conductor as a core, and a protective conductive sheathing surrounds the insulated core. The core and sheathing form an electrical circuit path for transmitting electrical power and data. The standard multi-conductor armored cable is a 7-conductor armored cable used for multiple channel tools. Such so called single conductor wireline cables, or similarly constructed multi-conductor cables, are almost exclusively used to operate downhole electrical devices because of a variety of reasons associated with the space limited and rigorous environment of a borehole. In such oil and gas borehole operations, a borehole depth of many thousands of feet is not uncommon. In communicating between the surface and downhole in a borehole over a wireline cable, control signals and data signals are normally converted to digital signals transmitted by a transmitter at rates up to a maximum of 20 Kbits/second. A receiver on the other end of the cable receives the signals, and a processor decodes the signals for further use.

The transmission and receiver scheme described above operates well when the rate of transmission does not exceed about 20 Kbits/second or the wireline is relatively short. However, the wireline transmission medium does cause a problem when the transmission is over a relatively long length or as the data rate increases. That is, the detection and distinguishing of the two voltage levels associated with the digital signal is impaired by distortions caused by the medium. Distortions become more acute for faster bit rates, where the periods at each of the two voltage levels are very short. For example, the frequency characteristic of a typical single conductor wireline used for downhole application has a loss of about −20 db at 5.6 Khz for a 30,000 foot length. At higher frequencies, the loss is significantly greater.

Often, multi-conductor cables are used when multiple channels to several sensors are used. The most commonly used cable today is a 7-conductor armored logging cable. For comparison purposes, a cable of at least 30,000 feet in length wherein the cable is a 7-conductor cable provided within an armored logging cable having a nominal size of 7/16 inches has a frequency bandwidth of 90 to 270 Khz. Bandwidth is defined as the frequency at which an input signal is attenuated to the point where the signal cannot be effectively recovered by the receiving device. Typically, and for the purposes of this disclosure, the attenuation is −60 db.

Today, while the wells become deeper, the measuring devices have also become more complex. That is, they provide data at a much greater rate. Moreover, the advent of digital computers installed at the well head measuring equipment has enabled the handling of greater volumes of data in a more effective fashion. All of this has occurred simultaneously increasing the requirements on the logging cable. The cables have become more complex i.e., they have added conductors, and the band pass requirements for the conductors have been increased. Still, the cables used today are unable to provide bandwidth in deep wells matching the transmission capabilities of the instrumentation.

There are several factors affecting the bandwidth of a particular cable configuration including resistance (R), capacitance (C), inductance (L) and conductance (or leakage.) Typically gains to be achieved in inductance and conductance are small since these factors are negligible. The most straightforward correction for high resistance of a cable, which is proportional to the diameter cable conductors, is to have larger diameter cables. This correction is opposed by the need to balance cable size with borehole parameters. Parameters such as borehole diameter and fluid pressure lead designers to smaller diameter cables. Capacitance of logging cables has been minimized, thereby increasing bandwidth, by adding conductors or by using a coaxial cable. As discussed earlier, the coaxial cable is used by referencing a signal to the shield (or armor.) Although capacitance is improved, the capacitances of typical coaxial and multi-conductor cables are still around 40 to 60 pF/ft.

Surface communication cables often utilize twisted pairs of conductors to increase bandwidth over single conductor transmission cables. The term twisted pair conductor, as used herein is defined as two electrically-conductive wires, which are electrically insulated from each other and twisted about each other at a given non-zero twist rate. Twisted pair conductors have heretofore been used in downhole applications only with the aide of supporting clamps or structures. One example of a clamped system is U.S. Pat. No. 6,206,133 for "Clamped receiver array using tubing conveyed packer elements". Another example is U.S. Pat. No. 6,580,751 to Gardner, et al. for "High speed downhole communications network having point to multi-point orthogonal frequency division multiplexing." The '133 patent describes a geophone array permanently or semi-permanently installed within a well borehole and communicating with a surface computer over twisted wire pairs. Such arrays as described in the '133 and '751 patents are not wireline systems and are unsuitable for self-supporting wireline logging in the drilling phase due to the need quickly insert the wireline data logger into a well borehole, take measurements and then remove the wireline all during a tripping cycle of the drill string.

One problem with implementing twisted pair conductors in a self-supporting wireline is stress induced at each twist crossing point causes conductor deformation or failure at the crossing point when high tensile loads are supplied. Therefore, prior wireline systems are typically designed to a standard wireline cable using single conductors or systems are designed with complicated clamping measures to secure and support the cable during use. An example of a standard wireline cable is described in U.S. Pat. No. 3,259,675 to Bowers for "Method of Manufacturing Armored Cables". The '675 patent describes a typical 7-conductor wireline cable, which includes a central conductor surrounded by six outer insulated conductors. While the outer conductors are helically wound, they are not twisted pairs as the term is known to those in the art and as the term is used herein.

To address some of the deficiencies described above, the present disclosure provides a load bearing cable having improved bandwidth and lower capacitance per foot for use in wireline applications. This disclosure also provides a multi-conductor load bearing cable used in a single conductor mode with lower capacitance than the typical single conductor cable used today.

Although increasing the bandwidth of a cable is necessary to improve data rate transmission, it should also be appreciated that the efficient use of the bandwidth is also required. As discussed earlier, instruments now have the capability to transmit data at rates far beyond cable capabilities. Methods of encoding data for transmission used in the telecommunication industry include Quadrature Amplitude Modulation (QAM), Carrierless Amplitude and Phase (CAP) modulation, and Discrete Multi-Tones (DMT) modulation. CAP is a modified QAM method, and DMT is the method in digital subscriber line (DSL) applications currently marketed mainly as an enhancement to internet connections. At this time, the well logging community has not taken advantage of the state of the art encoding methods. The primary driver being that the cables in current use cannot provide the bandwidth necessary to utilize these encoding methods efficiently.

To meet the demand for higher data rates, the present disclosure provides a system utilizing telecommunication data encoding methodologies in conjunction with a load bearing data cable having enhanced bandwidth to increase transmission data rate.

This disclosure also provides a method of well logging data transmission having a higher data rate.

SUMMARY OF THE DISCLOSURE

In general, the present disclosure provides a logging data transmission method and apparatus. The apparatus includes a logging cable having improved bandwidth characteristics.

In aspects, the present disclosure provides a suspended well logging device for use in a wellbore drilled in an earthen formation and methods for using such a well logging device. The device may include a cable configured to be conveyed into the wellbore; a single twisted pair of conductors positioned in the cable; and a conductive armor surrounding the single twisted pair of conductors. In embodiments, the device may further include a first channel formed using the single twisted pair of conductors; a second channel formed using the single twisted pair of conductors and the armor; and a wellbore logging tool coupled to an end of the cable.

In arrangements, the well logging device may include a power supply that transmits power via the single twisted pair of conductors. The power supply may also transmit power by using the armor. In arrangements, the device may include a data transmission device coupled to the single twisted pair of conductors. The data transmission device may also be operatively coupled to the armor. In arrangements, the well logging device may include a data transmission device and a power supply, both of which are operatively coupled to the single twisted pair of conductors. Either the power supply or the data transmission device may also be operatively coupled to the armor.

In aspects, the present disclosure provides a suspended well logging system for use in logging a well. The system may include a plurality of twisted pairs of signal conductors; a conductive armor surrounding the plurality of twisted pairs of signal conductors; a plurality of channels formed using the plurality of twisted pairs of signal conductors, wherein at least one channel is formed using at least one pair of twisted signal conductors and the armor. A wellbore logging tool may be operatively coupled to at least one of the plurality of channels. The well logging system may include a power supply that is operatively coupled to at least one channel of the plurality of channels. In embodiments, the well logging system may include a plurality of power supplies, each of which is operatively coupled a separate channel of the plurality of channels. The plurality of power supplies may includes one or more AC power sources and/or one or more DC power sources.

In embodiments, the well logging system may include one or more channels that are formed using at least two twisted pairs of signal conductors. In embodiments, the well logging system may include a data transmission device that is coupled to one or more of the plurality of channels. In embodiments, the well logging system may include a data transmission device that transmits an analog signal via at least a first channel of the plurality of channels and a digital signal via at least a second channel of the plurality of channels. In embodiments, the well logging system may include a data transmission device that transmits data at a first rate via at least a first channel of the plurality of channels and transmits data at a second rate different from the first rate via at least a second channel of the plurality of channels. In embodiments, the well logging system may include a power supply operatively coupled to at least one of the channels and a data transmission device operatively coupled to at least one of the channels.

BRIEF DESCRIPTION OF THE DRAWINGS

For detailed understanding of the present disclosure, references should be made to the following detailed description of the preferred embodiment, taken in conjunction with the accompanying drawings, in which like elements have been given like numerals and wherein.

DESCRIPTION OF THE PREFERRED EMBODIMENTS

Figure 1:
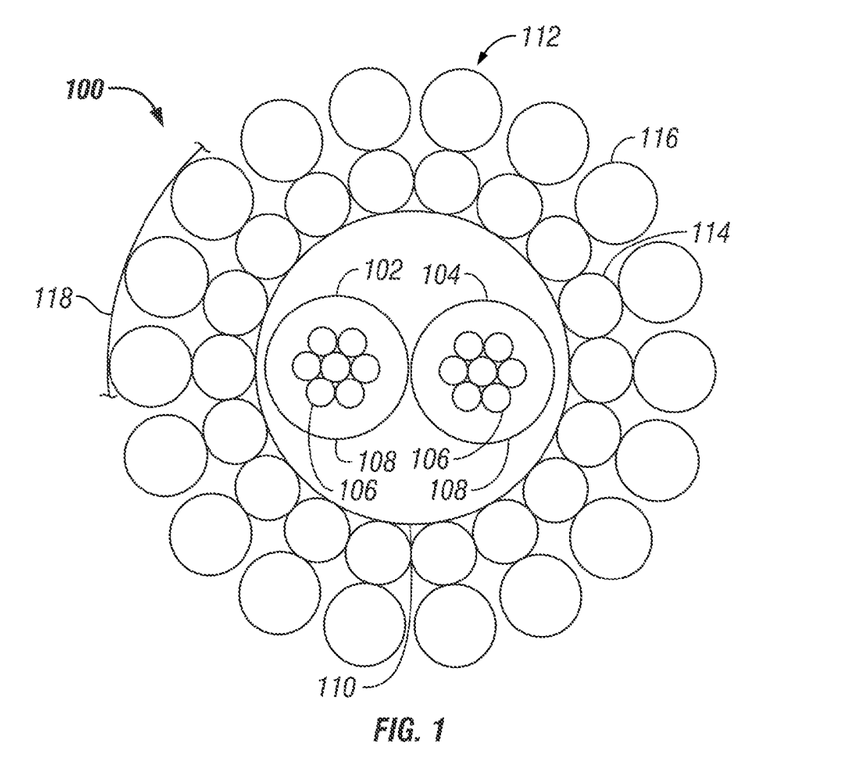
FIG. 1 is a cross section view of a cable according to an embodiment of the present disclosure.

FIG. 1 is a cross section view of a suspended well logging cable according to an embodiment of the present disclosure. The term suspend or suspended is used as those skilled in the art of wireline would understand, which understanding is to support the wireline cable at an upper point while allowing the remainder of the structure to hang substantially free on all sides so as not to sink or fall into the well borehole. A suspended wireline logging cable 100 according to one embodiment includes a twisted pair of insulated signal conductors 102 and 104 helically twisted together and positioned along a central axis of the cable. Each of the insulated conductors 102 and 104 comprises a group of electrically conductive stranded wires 106 encased by a tightly fitted, tubular sheath of insulating material 108. The stranded wires may be copper or any other suitable metallic material, and the insulating material 108 is preferably an extrudable plastic, which maximizes electrical insulation and temperature characteristics while minimizing the insulation thickness and dielectric constant. For downhole applications, a preferred insulating material 108 is a fluorinated ethylene propylene (FEP) plastic such as one sold under the brand TEFLON®. It may also be a combination such as TEFLON® and TEFZEL® brand FEP both of which are well known insulator brands. If FEP insulation is used for a downhole data transmission application, a thickness of 0.0125" (0.32 mm) is recommended. Power applications may require more insulation. A protective elastomer bedding 110 is disposed around the twisted pair to provide protection from abrasions and other damage due to rough handling and harsh environments.

The cable 100 includes a tensile load bearing tubing 112 comprising an inner layer 114 and an outer layer 116 of wires. The inner layer of wires 114 is a plurality of stranded structural steel wires with 0.025" (0.64 mm) total outer diameter helically wound around the elastomer bedding 110. The outer layer 116 is a plurality of stranded structural steel wires with 0.0345" (0.88 mm) total outer diameter helically wound around the inner layer 114. An outer protective sheath 118 may be used to protect the cable against abrasions caused by running the cable in and out of the borehole. The twisted pairs of signal conductors and the tensile load carriers will thus be within the outer protective sheath 118.

The overall outer diameter of a cable built to these dimensions would be 0.025" (6.35 mm). The relationship between resistance and diameter of a conductor is inversely proportional and the load bearing capability is directly proportional to the diameter. These relationships would normally lead one to larger cable designs. However, the overall diameter of a cable should be minimized in a downhole application, because the pressure of the fluid in the well may force a cable out of the well if the diameter is too large.

Figure 2A:
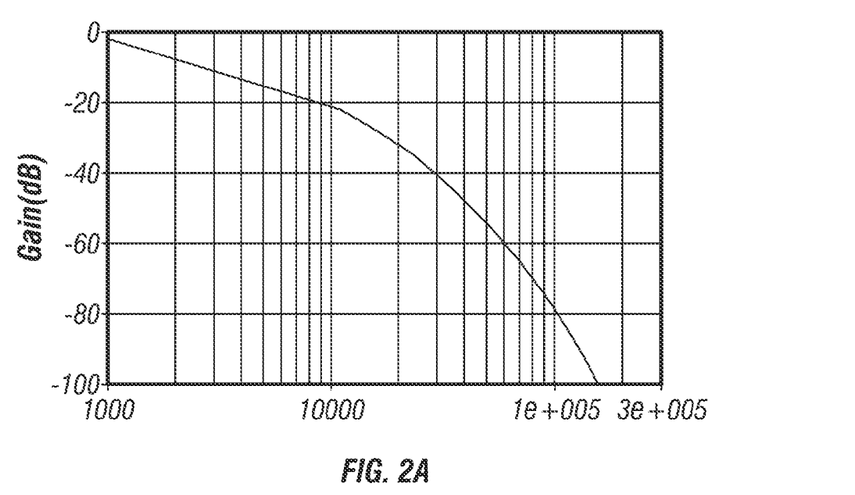
FIG. 2A is a simulation showing attenuation as a function of frequency using the dimensional and material specifications of a cable according to an embodiment of the present disclosure as a starting point for the simulation.
Figure 2B:
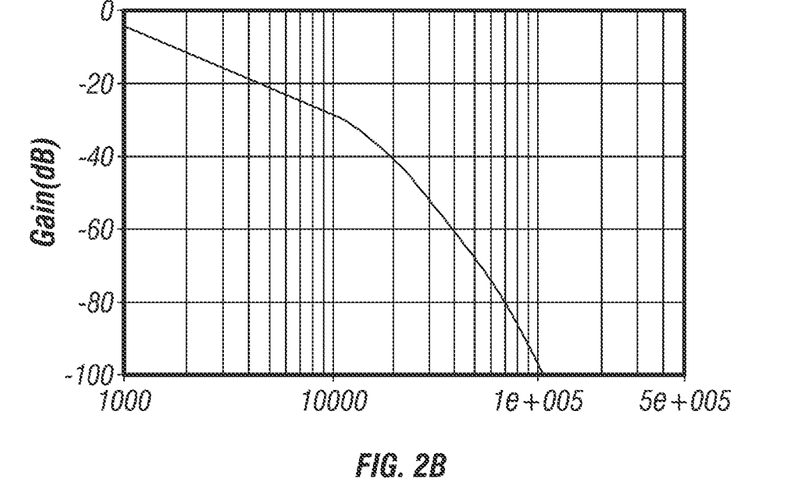
FIG. 2B is a simulation showing attenuation as a function of frequency for a cable in accordance with an embodiment of the present disclosure using measured values of capacitance as the simulation input.
Figure 2C:
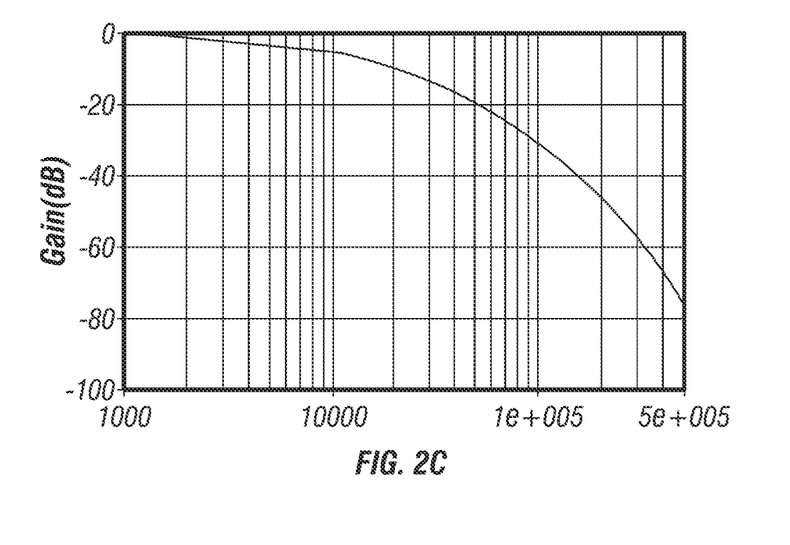
FIG. 2C is a simulation showing attenuation as a function of frequency using correction factors due to the effects of armor surrounding the conductors of a cable according to an embodiment of the present disclosure.

Referring now to FIG. 1 and FIGS. 2A through 2C showing bandwidth plots based a twisted pair load bearing cable as described above and shown in FIG. 1. FIG. 2A is a simulation using dimensional and material specifications of a cable as a starting point for the simulation. FIG. 2B is the same simulation using values from measurements with a capacitance meter. FIG. 2C is a simulation using correction factors due to the effects of armor 112 surrounding the conductors 102 and 104.

The most useful capacitance to know is the effective capacitance per foot ($C_{eff}$) of the cable. This is the effective capacitance between the conductors 102 and 104. To determine $C_{eff}$, equations are used that require measured values between the conductors 102 and 104 (designated as $C_{12m}$) and between each conductor and the armor 112 (designated as $C_{13m}$ and $C_{23m}$ respectively.) The computation is initiated with an experienced based empirical value of 1 F for the same parameters, $C_{12}$, $C_{13}$ and $C_{23}$. To determine the actual $C_{12}$ or $C_{eff}$, equations are then set up as follows:

$$\frac{C_{13} \times C_{23}}{C_{13} + C_{23}} + C_{12} = C_{12m};$$

$$\frac{C_{13} \times C_{12}}{C_{13} + C_{12}} + C_{13} = C_{13m}; \text{ and}$$

$$\frac{C_{23} \times C_{12}}{C_{23} + C_{12}} + C_{23} = C_{23m}.$$

The equations are then iteratively solved for the correct values of $C_{12}$, $C_{13}$, and $C_{23}$ yielding:

$C_{12}$=2.999×10-11 F/m;

$C_{13}$=8.999×10-11 F/m; and $C_{23}$=8.999×10-11 F/m.

Therefore, since 1 m=3.28084 ft, the $C_{eff}$ of $C_{12}$ for the cable described is actually 9.144 pF/ft. Compare this to the typical cable values of 40-60 pF/ft as stated above. The capacitance and conductor configuration of a cable according to the present disclosure results in a bandwidth of about 350 KHz.

There are two modes of operation or configuration modes useful for the twisted pair cable described above. These are the single conductor mode and the twisted pair or differential mode. In the single conductor mode, the ends of the conductors 102 and 104 are tied together electrically. A signal transmitted on the cable is then sensed with reference made to the armor 112. In the differential mode, the conductors 102 and 104 are each used independently for signal transmission, and the signal is sensed as a differential between the conductors 102 and 104. The bandwidth of either configuration is larger than the bandwidth of current single conductor load bearing cables used in well logging systems.

Figure 3:
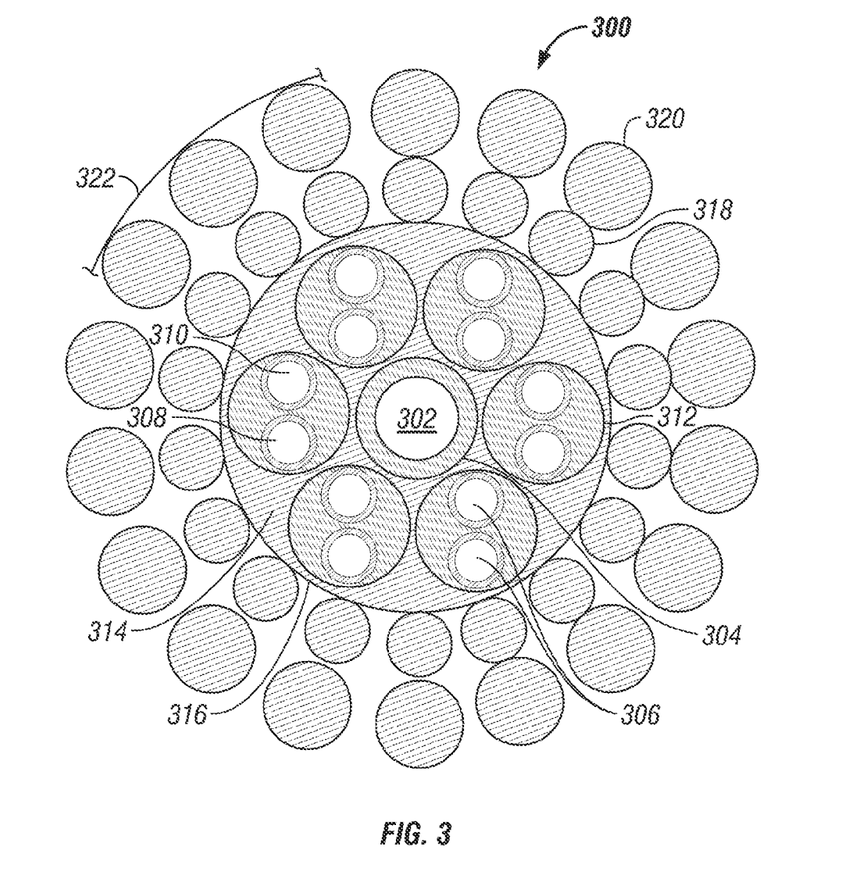
FIG. 3 is a cross section view of a 7-conductor cable configuration according to an embodiment of the present disclosure.

FIG. 3 is a cross section view of a 7-conductor cable configuration 300 according to the present disclosure. In this configuration, a core or center conductor 302 is covered in an insulation material 304 such as the extrudable TEFLON® FEP or a TEFLON®/TEFZEL® FEP combination as described above. Six twisted pair wires 306, each comprising twisted pair insulated conductors 308 and 310 as described above with respect to FIG. 1, are disposed around a circumference of the center conductor 302. The twisted pairs are also insulated as described in FIG. 1 with a protective cover 312. The center 302 and surrounding twisted pair conductors 306 are encased in an insulating dielectric material 314, several of such materials being well known in the art. Also well known in the art and not shown separately here is a plurality of fiber cords running axially the length of the cable and disposed in the dielectric material 314. These cords provide internal strength and stability to the cable to ensure the conductors are substantially fixed with respect to the internal distance between each other. Disposed circumferentially around the dielectric material 314 is an elongated tubular sheath 316, which may be a conductive paste, a plastic tape or an insulation material like well known in the art. A tensile load bearing covering comprised of an inner layer of wires 318 and an outer layer of wires 320 is disposed about the sheath 316. The inner layer of wires 318 is a plurality of stranded wires with helically wound around the sheath 316. The outer layer 320 is a plurality of stranded wires helically wound around the inner layer 318. An outer protective sheath 322 may be used be added to protect the cable against abrasions caused by running the cable in and out of the borehole. The twisted pairs of signal conductors and the tensile load carriers will thus be within the outer protective sheath 322.

In this configuration, center conductor 302 is shown as a single conductor. However, the intent is not to exclude the use of a twisted pair for the center conductor. Also, the preferable mode for the twisted pair wires is the single conductor mode where the ends are electrically connected, but the differential mode may be preferable in a particular application. As known in the art, any conductor may carry both data and power simultaneously.

Referring to FIGS. 1-3 and FIGS. 5A-C, embodiments of the present disclosure include a combination of tensile load carriers and twisted pairs of signal conductors twisted at a predetermined twist rate that enables self support of the wireline while minimizing deformation at the cross points of the conductors and maximizing cable capacitance characteristics to provide improved bandwidth.

Figure 5A:
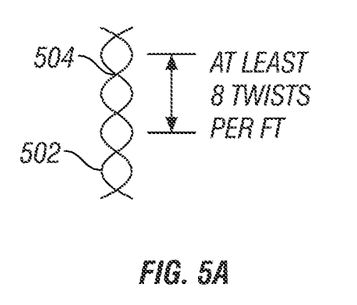
FIGS. 5A-5C illustrate an improved twist-rate according to embodiments of the present disclosure.

FIG. 5A shows a twisted pair of signal conductors 502 having at least 8 twists per foot. The higher twist rate allows for higher bandwidth of the cable and reduced stress at the crosspoints 504. The higher twist rate will require more conductor length per cable length unit. Added conductor length will add cost and weight to the overall cable. Therefore it may be desirable in other embodiments to reduce the twist rate.

Figure 5B:
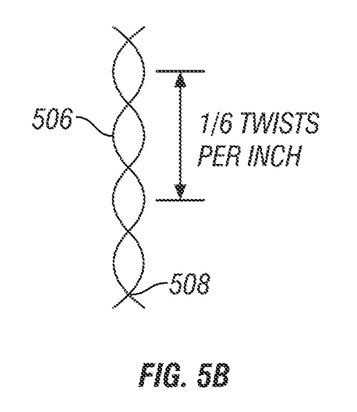

FIG. 5B shows a twisted pair of signal conductors 506 having a minimum of 1/6 twists per inch to provide the electrical characteristic benefits of twisted pair conductors while reducing the overall length of conductors and weight of the cable. Such a minimum twist rate still maintains reduced stress at the crosspoints 508.

Figure 5C:
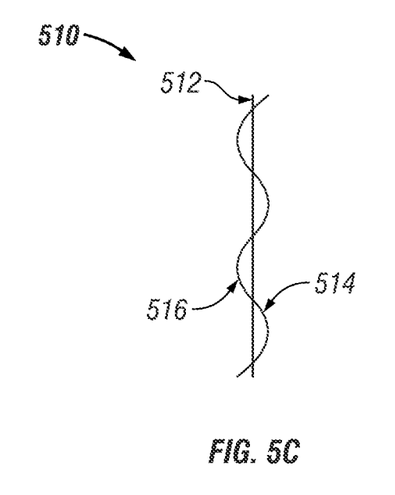

The twisted pair signal conductors of FIGS. 5A-5B in combination with the tensile load carriers described above and shown in FIGS. 1-3 provide a suspend wireline logging cable with improved bandwidth over known suspended wireline logging cables. Logging cable configurations according to several embodiments of the present disclosure are schematically illustrated in FIG. 5C. For simplicity, the figure does not illustrate the tensile load carrier of FIGS. 1 or 3, but such carrier should be implied for the purposes of the disclosure. A suspended wireline logging cable 510 includes a center conductor center conductor 512. The center conductor 512 may be a single conductor or a twisted pair of signal conductors. One or more twisted pair signal conductors 514 may be helically wrapped around the center conductor and insulated therefrom. The several embodiments may further include non twisted pair conductors, i.e. single insulated conductor wires 516 in combination with at least one twisted pair 514 or 512 as the case may be.

Figure 4:
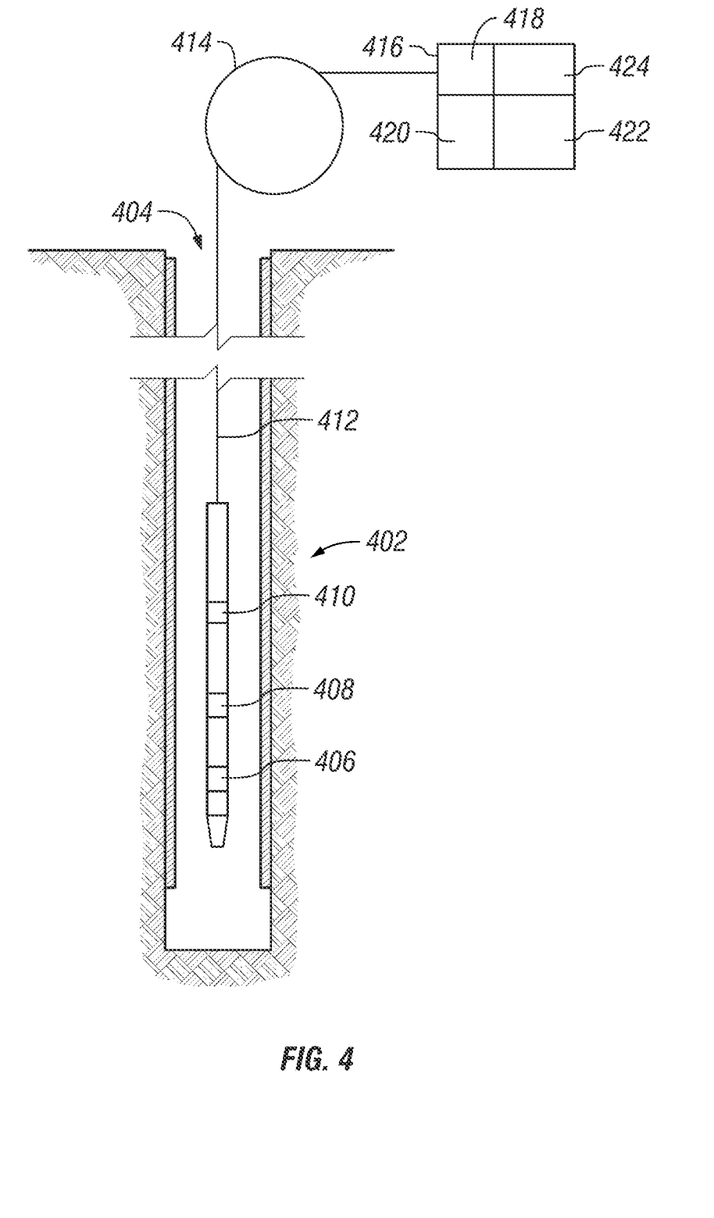
FIG. 4 is a schematic representation of a wireline system according to an embodiment of the present disclosure.

FIG. 4 is a schematic representation of a wireline system 400 according to the present disclosure. A tool 402 disposed in a well borehole 404 includes one or more sensors 406 for measuring parameters such as pressure, temperature, flow rate, etc. A processor 408 is located within the tool 402 for processing and encoding data received from the sensor 406. The processor 408 is connected to a downhole modem 410. The modem 410 can be of any high data rate type used in two-conductor communication using an encoding method such as quadrature amplitude modulation (QAM), carrierless amplitude and phase (CAP) modulation, or discrete multitones (DMT) modulation. The tool 402 is supported by a load bearing communication cable 412 as described above in FIG. 1 or FIG. 3 depending on the application needs.

At the surface the cable is carried by a sheave and winch assembly 414, and the end of the cable 412 is connected to a surface control unit 416 comprising a surface modem 418, a processor 420, an output/storage device 422. The surface modem is complementary to the downhole modem 410, and the processor 420 is connected to the surface modem 418 to receive, decode and process the data transmitted to the surface. The processor 420 is also used to send commands to the instruments downhole via the modem-cable-modem connection. An output device/storage 422 such as a display screen, printer, magnetic tape, CD, or the like is connected to the processor for display and/or storage of the processed data. The output device 422 may also include a transmitter 424 for relaying the processed data to a remote location.

In operation, a well engineer or user deploys the tool 402 supported by the cable 412 in the well 404 to a desired depth using the winch and sheave mechanism 414. Commands generated by user input, algorithm, or a combination are encoded at the surface using one of the methods described above. The encoded commands are then transmitted by the modem 418 through the cable 412 to the tool 402 disposed in the well. The downhole modem 410 receives the command which is then decoded for downhole operation of the tool.

When sensors 406 are activated to sense a desired parameter, the sensed parameter is delivered to the downhole processor 408 for pre-processing or sent directly to the surface. In either case, the data is encoded using one of the methods described above and transmitted by the downhole modem 410 through the cable 412 to the surface control unit 416. At the surface, the surface modem 418 receives the data. The processor 420 decodes the signal, performs further processing of the data, and the data is then displayed on a screen, printed on a printer, stored on magnetic tape, CD, or the like. The data may also be relayed to any remote location using a transmitter 424.

The teachings of the present disclosure further include arrangements for communicating with downhole tools and transmitting power to downhole tools. The data transmission methodologies can be used in conjunction with the power transmission methodologies or the teachings of the present disclosure can be used separately. The present teachings may also be used with conventional power and/or data transmission techniques. It will further be appreciated that communication and/or power transmission systems according to the present disclosure may utilize cables with single conductive pairs as well as cables with multiple pairs of conductors. Described below are exemplary power and/or data transmission techniques for use in conjunction with cables having one or more than one twisted pair of conductors. It should be appreciated, however, that there may be numerous permutations to the described embodiments.

Figure 6A:
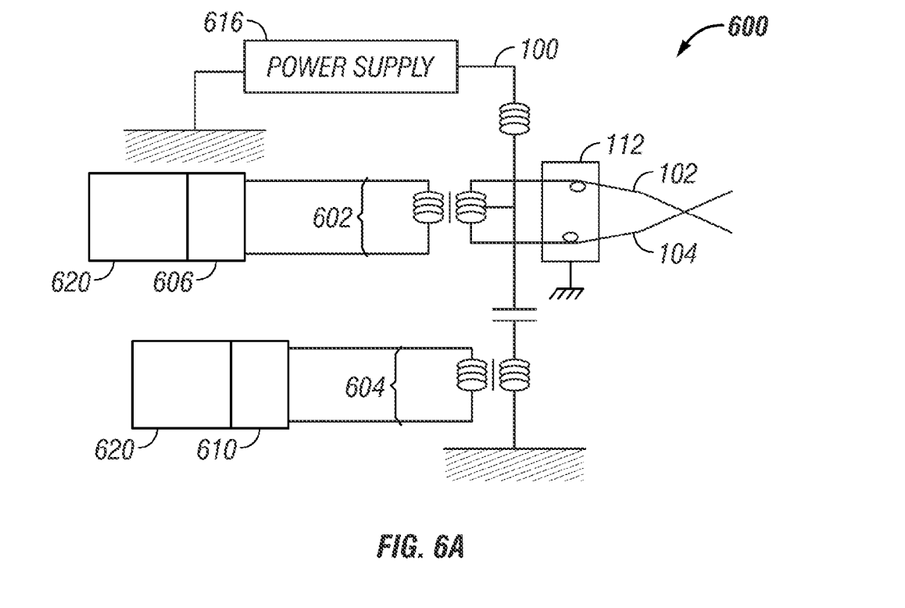
FIGS. 6A-6B is a schematic representation of another wireline system according to an embodiment of the present disclosure.
Figure 6B:
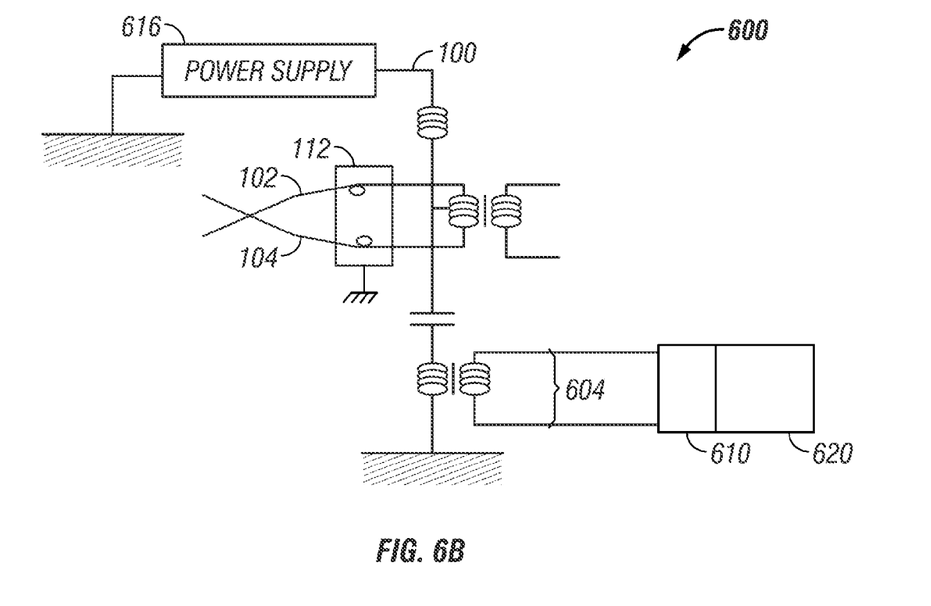

Referring now to FIGS. 1, 6A and 6B, there is shown one embodiment of a system 600 for transmitting data using a cable 100 having a single twisted pair of conductors 102, 104. As shown, data communication is performed using a first channel 602 and a second channel 604. The first channel 602 is formed of surface electronics 606 and the single twisted pair of conductors 102, 104. The second channel 604 is formed of surface electronics 610, the single twisted pair of conductors 102, 104, and the armor 112. The system may also include a power supply 616 for use with the cable 100. The power supply 616 may supply AC power or DC power. In one arrangement, the power supply 616 transmits power by a single pair of conductors 102, 104. In another arrangement, the power supply 616 transmits power using the single pair of conductors 102, 104 and the armor 112. It should be appreciated that the data transmission system 600 can be used in conjunction with or separately from the power supply 616. The surface electronics 606, 610 may use known electrical devices such as inductive elements, capacitors, modulators, etc. As noted previously, the armor 112 may be formed of conductive elements such as a layer of metal wires.

Figure 7:
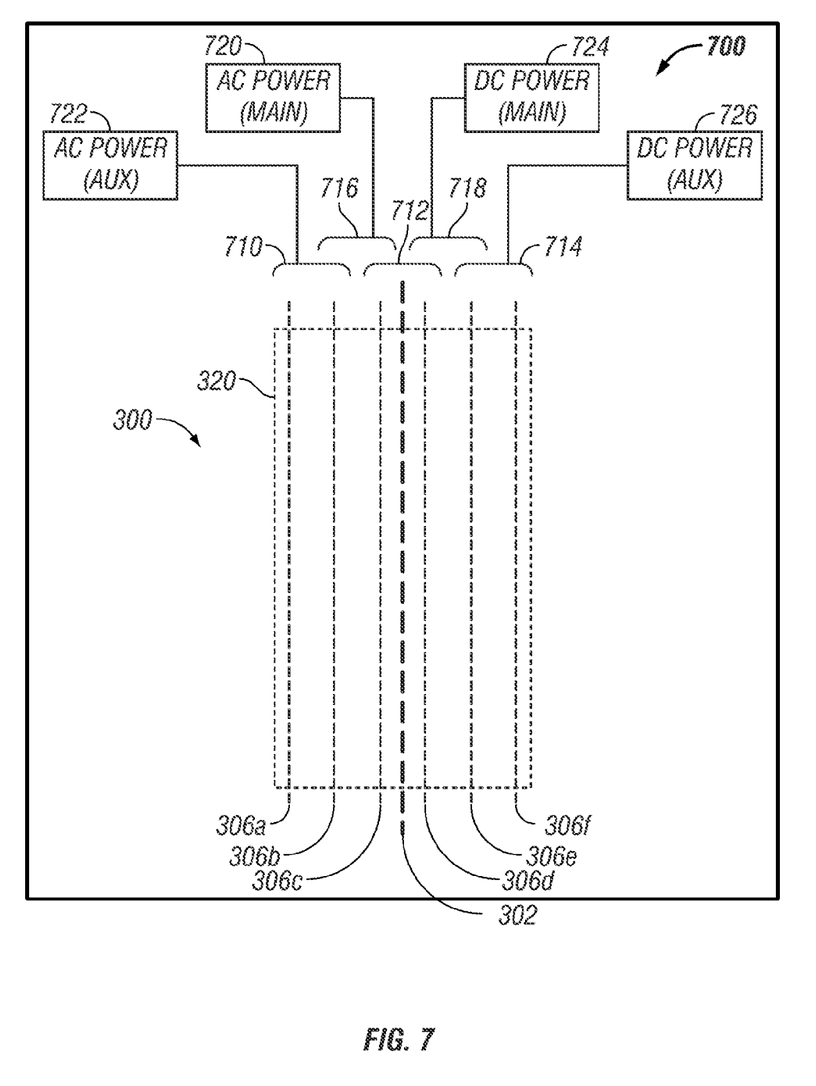
FIG. 7 schematically illustrates a wireline system having a plurality of channels according to an embodiment of the present disclosure.

Referring now to FIG. 7, there is shown a system 700 for transmitting data and/or power using the cable 300 shown in FIG. 3. The system 700 uses multiple channels to enable data communication between the surface and the downhole tool and/or power transfer from the surface to equipment conveyed on the cable 300. The cable 300 has six pairs of conductors (306a-f), each of which provides a channel for data communication and/or power transfer. Additionally, in a manner analogous to the arrangements shown in FIGS. 6 a-b, each of the twisted pairs (306a-f) may be coupled to the armor (320) to provide additional data/power communication channels. In a further variant, pairs of conductor pairs may be used to form data channels and/or power transfer channels. For example, conductors (306a,b) may form a channel 710, conductors (306c,d) may form a channel 712, and conductors (306e,f) may form a channel 714. Also, conductor 312b may be paired with conductor 312c to form a channel 716 and conductor 312d can be paired with conductor 312e to form a channel 718. Furthermore, additional channels may be formed by using conductors within a pair of conductors. For brevity, the term "signal" is intended to encompass data signal and electrical power. Thus, a signal conductor or signal channel is a conductor or channel configured to convey data and/or power. The described pairings are intended to only be non-limiting illustrations of the pairings that may be utilized to provide additional data syndication channels. With the benefit of the present teachings, other types of pairings and subsequent data communication channels will be apparent to one skilled in the art.

Numerous power transmission arrangements may also be utilized in connection with the cable 300. These arrangements can use one power source or a plurality of power sources. Each of these power sources can supply the same type of power or different types of power. Furthermore, these power sources may be coupled to different downhole components. In the non-limiting embodiments shown, power is supplied using four sources. AC power is supplied by a main AC power supply 720 and an auxiliary AC power supply 722. DC power may be supplied by a main DC power source 724 and an auxiliary DC power source 726. The main power supplies 720, 724 supply power to the primary instruments of the downhole tool such as sensors, sources such as NMR devices, acoustic sources or radiation sources and the like. The auxiliary power supplies 722, 726 supplies power to support devices such as downhole motors, valves, actuators, anchors, etc. In a manner similar to that described with respect to FIGS. 6A-B, the power supplies 720-726 can supply power via individual conductor pairs, pairs of conductors, and/or individual conductors and the armor.

Likewise, in a manner analogous to the arrangement shown in FIG. 7, numerous data transmission arrangements may also be utilized in connection with the cable 300. These arrangements can use one communication device (620, FIGS. 6A-6B) or a plurality of communication devices. Each of these communication devices uses the same media or different types, e.g., analog signals, digital signals, etc. Furthermore, these communication devices may transmit data at different rates using suitable modulators. The communication device or data transmission device may be one device that is configured to operate using different types of signals (e.g., analog or digital) and at different transmission rates or may be a plurality of devices that are each configured to have different operating characteristics. Thus, the communication devices may be coupled to different downhole components. It should be understood that that a plurality of communication devices may be used in conjunction with a plurality of power supplies. The term operatively coupled generally refers to a connection that enables the transmission of data and/or power or that enables some functionality beyond a physical connection.

It should be appreciated that the data, and/or power transmission arrangements shown can provide significant flexibility in constructing and/or operating downhole tools. Thus, in addition to increased bandwidth available for data communication, the data transmission regimes can be constructed to maximize use of the available bandwidth. Furthermore, power can be supplied to downhole tools in a manner that is efficient and improves downhole tool service life.

The foregoing description is directed to particular embodiments of the present disclosure for the purpose of illustration and explanation. It will be apparent, however, to one skilled in the art that many modifications and changes to the embodiment set forth above are possible without departing from the scope of the disclosure and the following claims.

What is claimed is:

1. An apparatus for use in a wellbore drilled in an earthen formation, comprising:
   a) a cable configured to be conveyed into the wellbore;
   b) single twisted pair of conductors positioned in the cable;
   c) a conductive armor surrounding the single twisted pair of conductors;
   d) a first data signal channel formed using the single twisted pair of conductors;
   e) a second data signal channel formed using the single twisted pair of conductors and the armor; and
   f) a wellbore logging device coupled to an end of the cable.

2. The apparatus of claim 1, further comprising a power supply transmitting power via the single twisted pair of conductors.

3. The apparatus of claim 2, wherein the power supply transmits power by also using the armor.

4. The apparatus of claim 1, further comprising a data transmission device operatively coupled to the single twisted pair of conductors to transmit data thereacross.

5. The apparatus of claim 4, wherein the data transmission device is also operatively coupled to the armor to transmit data thereacross.

6. The apparatus of claim 4, further comprising a power supply operatively coupled to the single twisted pair of conductors, wherein one of the (i) power supply, and (ii) the data transmission device is also operatively coupled to the armor.

7. A suspended well logging system, comprising:
a plurality of twisted pairs of signal conductors;
a conductive armor surrounding the plurality of twisted pairs of signal conductors;
a plurality of data channels formed using the plurality of twisted pairs of signal conductors,
wherein at least one data channel is formed using at least one pair of twisted signal conductors and the armor; and
a wellbore device operatively coupled to at least one of the plurality of data channels.

8. The well logging system of claim 7, further comprising a power supply operatively coupled to at least one channel of the plurality of data channels.

9. The well logging system of claim 7, further comprising a plurality of power supplies each of which is operatively coupled to a separate channel of the plurality of channels.

10. The well logging system of claim 9, wherein the plurality of power supplies includes at least one AC power source and at least one data DC power source.

11. The well logging system of claim 7, wherein at least one data channel is formed using at least two twisted pairs of signal conductors.

12. The well logging system of claim 7, further comprising a data transmission device coupled to at least one of the plurality of data channels.

13. The well logging system of claim 12, wherein the data transmission device is coupled to at least two of the plurality of data channels.

14. The well logging system of claim 7 further comprising a data transmission device that transmits an analog signal via at least a first data channel of the plurality of data channels and a digital signal via at least a second data channel of the plurality of data channels.

15. The well logging system of claim 7 further comprising a data transmission device that transmits data at a first rate via at least a first data channel of the plurality of data channels and transmits data at a second rate different from the first rate via at least a second data channel of the plurality of channels.

16. The well logging system of claim 7, further comprising a power supply operatively coupled to at least one of the plurality of channels and a data transmission device operatively coupled to at least one of the plurality of data channels.

17. A system as described by claim 7, wherein the logging tool is configured to measure a parameter of interest relating to the formation.

18. A method of using a suspended well logging cable for transmission of a signal between a well borehole location and a surface location, the method comprising:
a) positioning a single twisted pair of conductors in the cable;
b) surrounding the single twisted pair of conductors with a conductive armor;
c) forming a first data signal channel using the single twisted pair of conductors;
d) forming a second data signal channel using the single twisted pair of conductors and the armor; and
e) coupling a wellbore device to an end of the cable; and
f) conveying the cable into the wellbore.

19. The method of 18, further comprising operatively coupling a power supply to the single twisted pair of conductors and to the armor to convey power thereacross.

20. The method of 18, further comprising operatively coupling a data transmission device to the single twisted pair of conductors and to the armor to transmit data thereacross.

21. The method of 18, further comprising a plurality of signal channels formed by a plurality of twisted pairs.

22. A suspended well logging system, comprising:
a plurality of twisted pairs of signal conductors;
a conductive armor surrounding the plurality of twisted pairs of signal conductors;
a plurality of data channels formed using the plurality of twisted pairs of signal conductors,
wherein at least one data channel is formed using at least one pair of signal conductors and the armor, and wherein the at least one pair of conductors has at least two twists per foot; and
a wellbore device operatively coupled to at least one of the plurality of data channels.

23. The apparatus of 1, wherein the single twisted pair has a number of twists per foot selected to provide bandwidth of a channel including the single twisted pair sufficient for each of quadrature amplitude modulation, carrierless amplitude and phase modulation, and discrete multi-tones modulation.

24. The apparatus of 1, wherein the single twisted pair has an effective capacitance below 30 picofarads per foot.

25. The apparatus of 1, wherein the single twisted pair has at least two twists per foot.

26. The apparatus of 1, wherein a signal on the first data signal channel is sensed as a differential between the conductors in the single twisted pair; and, another signal on the second data signal channel is sensed on the twisted pair with reference to the armor.

* * * * *